(12) United States Patent
Bhardwaj et al.

(10) Patent No.: US 9,324,102 B2
(45) Date of Patent: Apr. 26, 2016

(54) SYSTEM AND METHOD TO RETRIEVE RELEVANT INVENTORY USING SKETCH-BASED QUERY

(71) Applicant: eBay Inc., San Jose, CA (US)

(72) Inventors: Anurag Bhardwaj, Sunnyvale, CA (US); Wei Di, San Jose, CA (US); Robinson Piramuthu, Oakland, CA (US); Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/207,288

(22) Filed: Mar. 12, 2014

(65) Prior Publication Data

US 2014/0279265 A1 Sep. 18, 2014

Related U.S. Application Data

(60) Provisional application No. 61/784,791, filed on Mar. 14, 2013.

(51) Int. Cl.
| | |
|---|---|
| *G06Q 30/06* | (2012.01) |
| *G06T 7/00* | (2006.01) |
| *G06K 9/62* | (2006.01) |
| *G06F 17/30* | (2006.01) |

(52) U.S. Cl.
CPC ...... *G06Q 30/0627* (2013.01); *G06F 17/30277* (2013.01)

(58) Field of Classification Search
CPC .................................................. G06Q 30/06
USPC .............................................. 705/26.1–27.2
See application file for complete search history.

(56) References Cited

U.S. PATENT DOCUMENTS

| | | | | |
|---|---|---|---|---|
| 2006/0250393 | A1* | 11/2006 | Tsang et al. .................. | 345/420 |
| 2009/0307219 | A1* | 12/2009 | Bennett ............................ | 707/6 |
| 2011/0302522 | A1* | 12/2011 | Cao et al. ...................... | 715/780 |
| 2012/0054177 | A1* | 3/2012 | Wang et al. .................... | 707/723 |
| 2012/0072410 | A1* | 3/2012 | Li et al. .......................... | 707/711 |
| 2013/0097181 | A1* | 4/2013 | Sud .................... | G06F 17/30864 707/748 |
| 2014/0149213 | A1* | 5/2014 | Fallatah ...................... | 705/14.53 |
| 2014/0328540 | A1* | 11/2014 | Zhang et al. .................. | 382/173 |

OTHER PUBLICATIONS

Kumar Rajendran, R.; Shih-Fu Chang. Image retrieval with sketches and compositions. Latest Advances in the Fast Changing World of Multimedia (Cat. No. 00TH8532): 717-20 vol. 2;3 vol. xxxv+17778. IEEE. (2000) (https://search.proquest.com/professional/docview/831264164/1512213537E183C1DE/1?accountid=142257).*

Stacey, Kevin, "Computer Program Can Identify Rough Sketches", © 2014 Brown University, [Online]. Retrieved from the Internet: <URL:http://news.brown.edu/pressreleases/2012/09/sketches>, (Sep. 12, 2012), 3 pgs.

\* cited by examiner

*Primary Examiner* — Jeffrey A Smith
*Assistant Examiner* — Jennifer Lee
(74) *Attorney, Agent, or Firm* — Schwegman Lundberg & Woessner, P.A.

(57) ABSTRACT

In various example embodiments, a system and method for sketch based queries are presented. A sketch corresponding to a search item may be received from a user. At least a portion of the sketch may be generated by the user. An item attribute may be extracted from the sketch. The item attributed may correspond to a physical attribute of the search item. A set of inventory items similar to the search item may be identified based on the extracted item attribute and a search scope. The identified set of inventory items may be presented to the user.

19 Claims, 15 Drawing Sheets

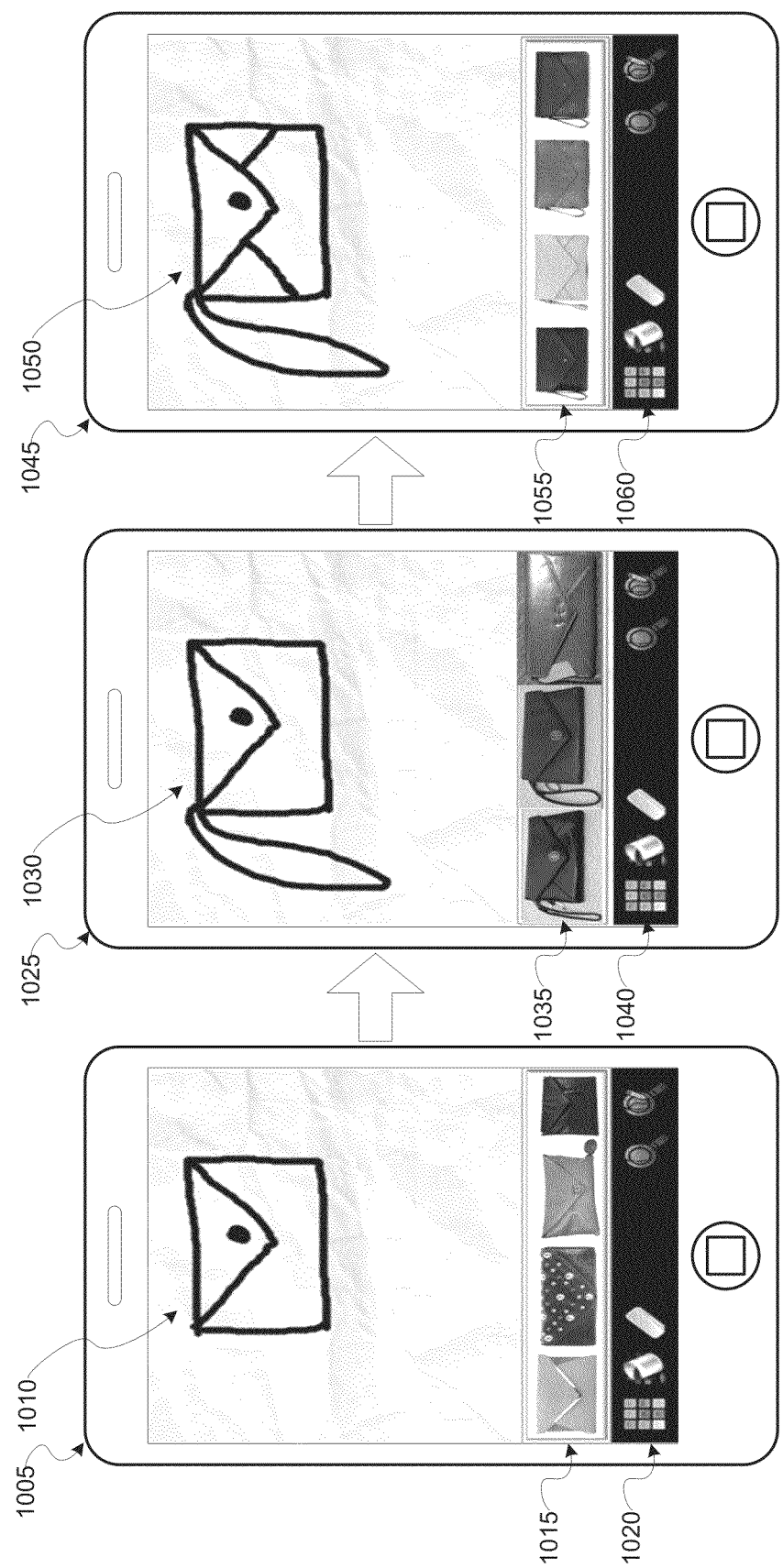

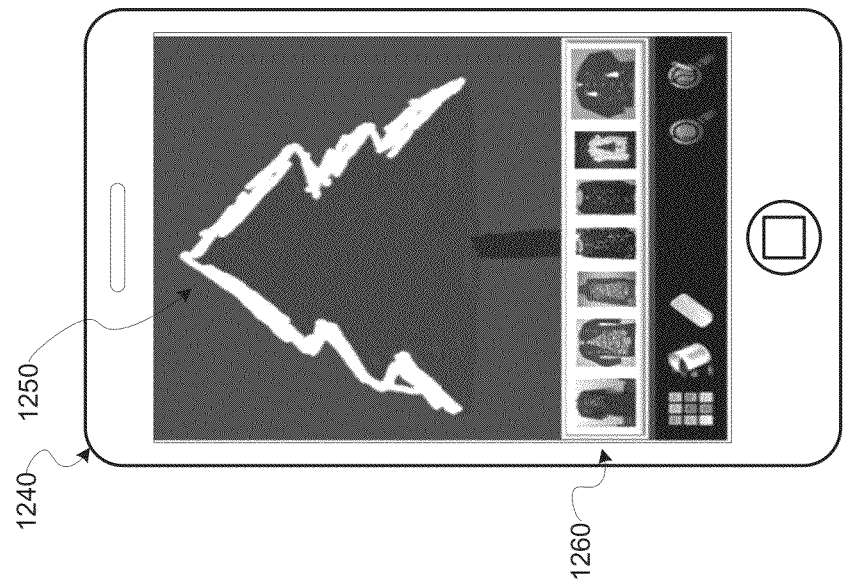
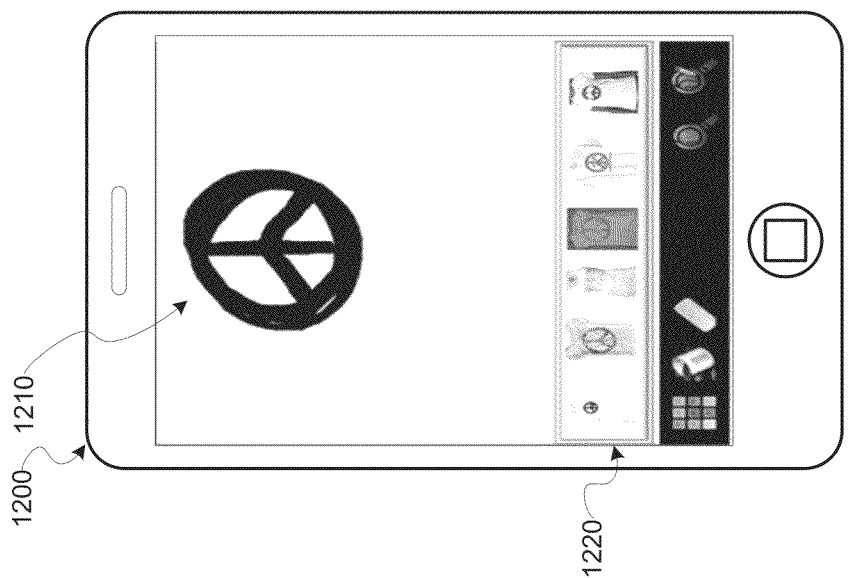
FIG. 12A
FIG. 12B

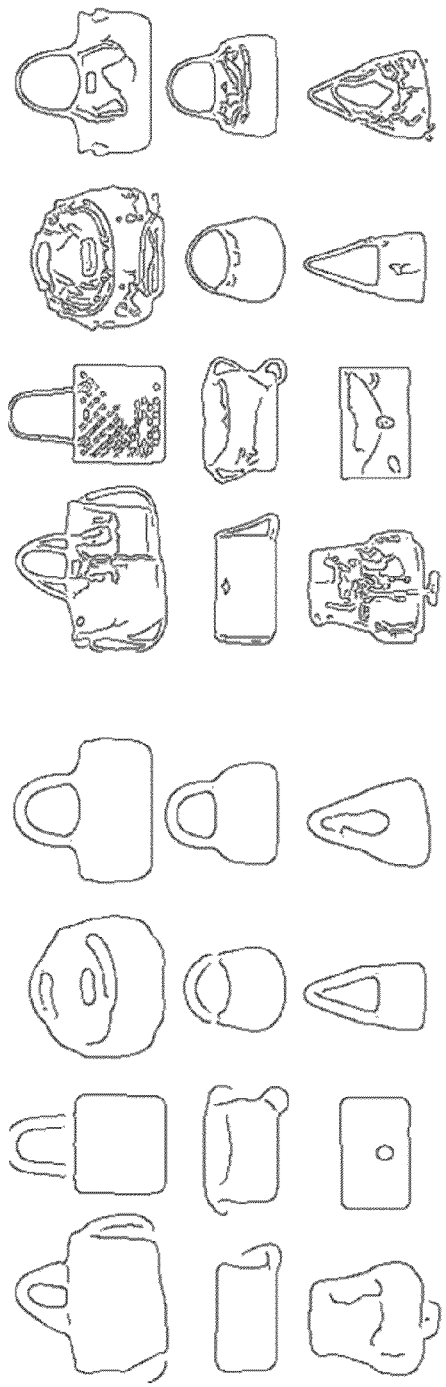
FIG. 14A
FIG. 14B
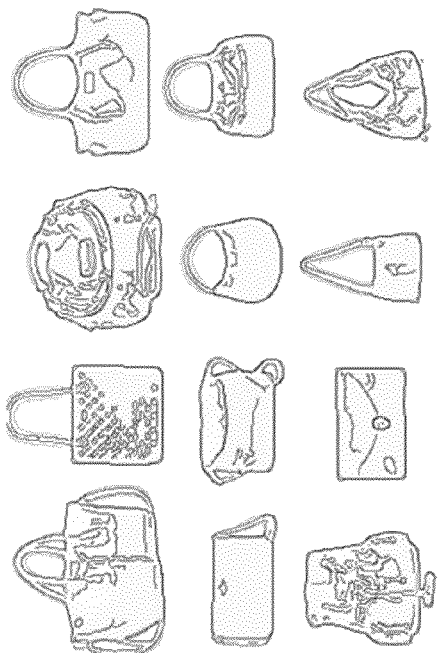
FIG. 14C
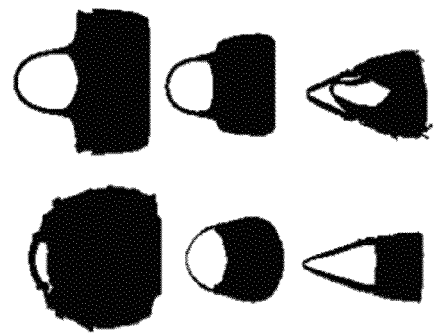
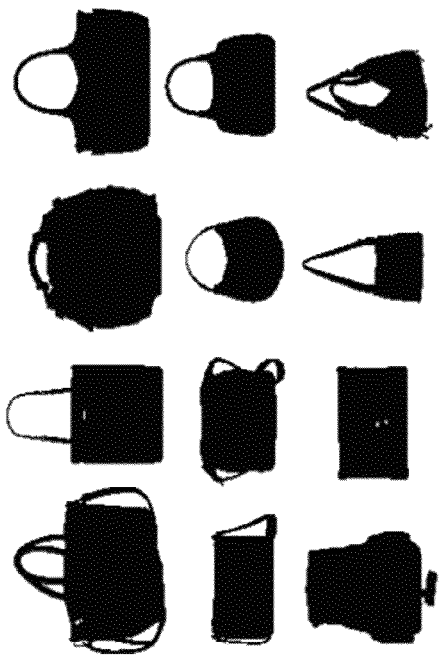
FIG. 14D

SYSTEM AND METHOD TO RETRIEVE RELEVANT INVENTORY USING SKETCH-BASED QUERY

RELATED APPLICATIONS

This application claims the priority benefit of U.S. Provisional Application No. 61/784,791, filed Mar. 14, 2013, which is hereby incorporated by reference in its entirety.

TECHNICAL FIELD

Embodiments of the present disclosure relate generally to image recognition, and more particularly, but not by way of limitation, to retrieving relevant inventory using sketch-based queries.

BACKGROUND

Images can be used to convey information more efficiently or in a way not possible with text, particularly from the viewpoint of a user viewing the images or to facilitate electronic commerce (e-commerce). In order to use images based on the wealth of information contained therein, image processing is performed to extract, identify, or otherwise recognize attributes of the images. Once extracted, the image data can be used in a variety of applications. Depending on the particular application(s), certain types of image processing may be implemented over others.

BRIEF DESCRIPTION OF THE DRAWINGS

Various ones of the appended drawings merely illustrate example embodiments of the present disclosure and cannot be considered as limiting its scope.

FIGS. 10A, 10B, and 10C depicts example user interfaces for receiving a sketch and determining similar inventory items based on the sketch.

FIGS. 12A and 12B depicts example user interfaces for a sketch query for an item in a particular item category.

FIGS. 14A, 14B, 14C, and 14D depict example embodiments of identifying image attributes from images.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Described in detail herein are systems and methods for determining matching (or nearly matching) items using a sketch-based query. Sketch input may be useful when a user knows what he/she wants but does not have ready access to an item to take a photo of it. Additionally, describing an item of interest may lend itself to a pictorial rather than textual description. For instance, the user may be interested in a handbag of a certain shape, handle, opening, and so on. While this may be difficult to textually describe, this may be easy to sketch.

In example embodiments, relevant e-commerce items may be retrieved from large inventories (e.g., items listed for sale on an e-commerce website). A user provides a sketch of an item of interest using a device, such as a smart phone or tablet. Sketches of varying degree of complexity and attributes are acceptable such as, but not limited to, a line drawing; black and white drawing; a drawing including color, pattern, or shape; an image annotated with lines, color, or pattern; and the like. The user may also indicate an item category of interest (e.g., handbags). In response, a system parses the sketch to determine its attributes including the item category (if not provided by the user). The system matches the attributes of the sketch to attributes of item images corresponding to inventory items. The best matching items may be ranked by relevance or other criteria, and item images corresponding to the matching items are presented to the user on the user device. The user is given the option to refine the sketch, and in response, the system updates the matching results. One or more iterations of refinement are possible.

Figure 1:
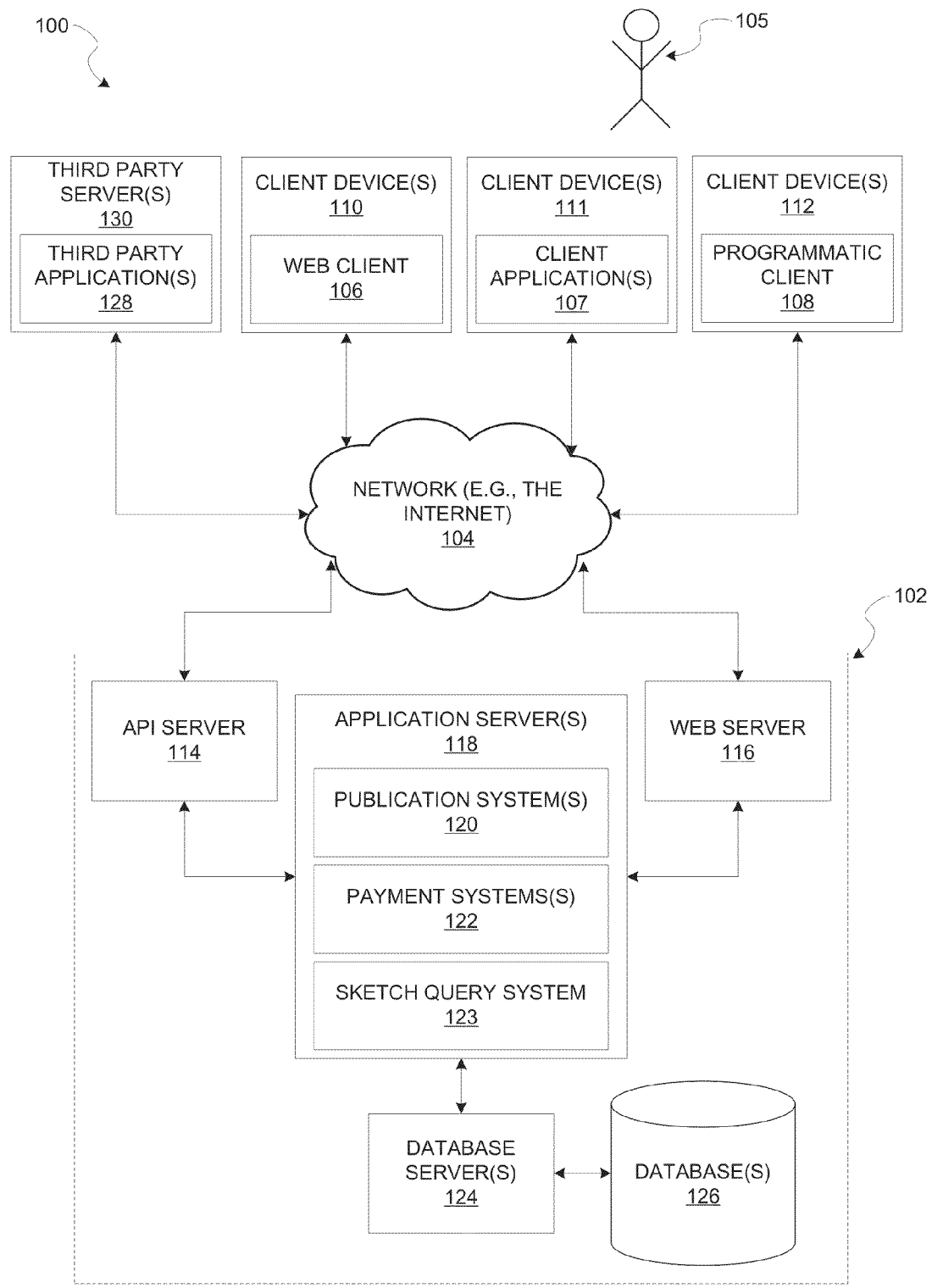
FIG. 1 is a block diagram of a networked system depicting an example embodiment.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110, 111, and 112. FIG. 1 illustrates, for example, a web client 106 (e.g., a browser, such as the Internet Explorer® browser developed by Microsoft® Corporation of Redmond, Wash. State) and a programmatic client 108 executing on respective client devices 110 and 112.

Each of the client devices 110, 111, and 112 may comprise a computing device that includes at least a display and communication capabilities with the network 104 to access the networked system 102. The client devices 110, 111, and 112 may comprise, but are not limited to, remote devices, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. In further embodiments, the client devices 110, 111, and 112 may comprise one or more of a touch screen, accelerometer, gyroscope, camera, microphone, and global positioning system (GPS) device. Each of the client devices 110, 111, and 112 may communicate with the network 104 via a wired or wireless connection. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110, 111, and 112 may include one or more applications (also referred to as "apps") such as, but not limited to, a web browser, messaging application, electronic mail (email) application, an e-commerce site application (also referred to as a marketplace application), and the like. For example client applications 107 may include various components operable to present information to the user and communicate with networked system 102. In some embodiments, if the e-commerce site application is included in a given one of the client devices 110, 111, and 112, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in a given one of the client devices 110, 111, and 112, the given one of the client devices 110, 111, and 112 may use its web browser to access the e-commerce site (or a variant thereof) hosted on the networked system 102. Although three client devices 110, 111, and 112 are shown in FIG. 1, more or less than three device machines can be included in the system 100.

One or more users 105 may be a person, a machine, or other means of interacting with the client devices 110, 111, and 112. In example embodiments, the user 105 is not part of the network architecture 100, but may interact with the network architecture 100 via the client devices 110, 111, and 112 or another means.

An application program interface (API) server 114 and a web server 116 are coupled to, and provide programmatic and web interfaces respectively to, one or more application servers 118. The application servers 118 may host one or more publication systems 120 and payment systems 122, each of which may comprise one or more modules or applications and each of which may be embodied as hardware, software, firmware, or any combination thereof. The application servers 118 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 120. The databases 126 may also store digital goods information in accordance with example embodiments.

The publication systems 120 may provide a number of publication functions and services to users 105 that access the networked system 102. The payment systems 122 may likewise provide a number of functions to perform or facilitate payments and transactions. While the publication systems 120 and payment systems 122 are shown in FIG. 1 to both form part of the networked system 102, it will be appreciated that, in alternative embodiments, each system 120 and 122 may form part of a payment service that is separate and distinct from the networked system 102. In some embodiments, the payment systems 122 may form part of the publication system 120.

The sketch query system 123 may provide functionality operable to receive sketches from the user or users, analyze the sketch, identify similar items as depicted by the sketch, and cause presentation of the identified items to the user. In some example embodiments, the sketch query system may communicate with the publication systems 120 (e.g., retrieving listings and images corresponding to the listings) and payment system 122 (e.g., purchasing a listing). In an alternative embodiment, the sketch query system 123 may be a part of the publication system 120. In some example embodiments, the sketch query system 123 or at least part of the sketch query system 123 may be part of the client applications 107.

Further, while the client-server-based network architecture 100 shown in FIG. 1 employs a client-server architecture, the present inventive subject matter is, of course, not limited to such an architecture, and may equally well find application in a distributed, or peer-to-peer, architecture system, for example. The various publication and payment systems 120 and 122 may also be implemented as standalone software programs, which do not necessarily have networking capabilities.

The web client 106 may access the various publication and payment systems 120 and 122 via the web interface supported by the web server 116. Similarly, the programmatic client 108 accesses the various services and functions provided by the publication and payment systems 120 and 122 via the programmatic interface provided by the API server 114. The programmatic client 108 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 108 and the networked system 102.

Additionally, a third party application(s) 128, executing on a third party server(s) 130, is shown as having programmatic access to the networked system 102 via the programmatic interface provided by the API server 114. For example, the third party application 128, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
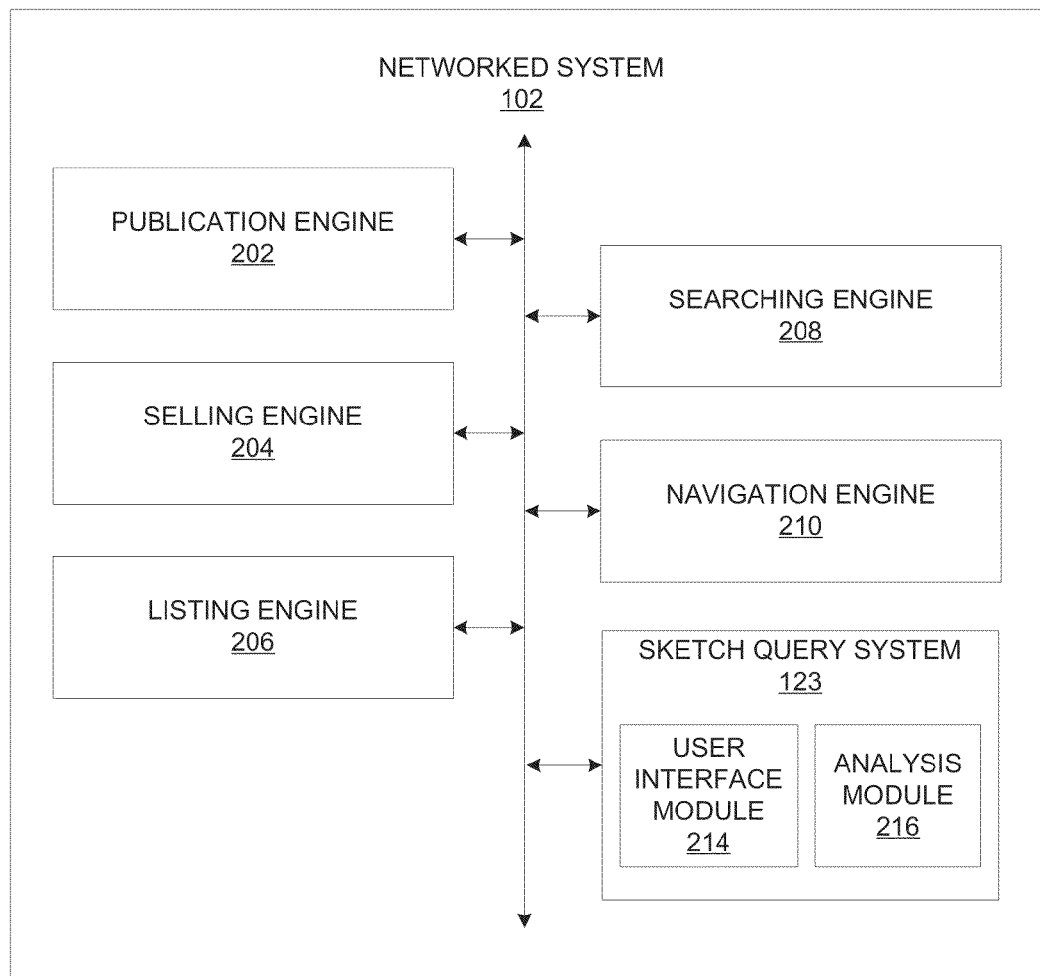
FIG. 2 illustrates a block diagrams showing components provided within the system of FIG. 1 according to some example embodiments.

FIG. 2 illustrates a block diagram showing components provided within the networked system 102 according to some embodiments. The networked system 102 may be hosted on dedicated or shared server machines (not shown) that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more databases 126 via the database servers 124.

The networked system 102 may provide a number of publishing, listing, and/or price-setting mechanisms whereby a seller (also referred to as a first user) may list (or publish information concerning) goods or services for sale or barter, a buyer (also referred to as a second user) can express interest in or indicate a desire to purchase or barter such goods or services, and a transaction (such as a trade) may be completed pertaining to the goods or services. To this end, the networked system 102 may comprise at least one publication engine 202 and one or more selling engines 204. The publication engine 202 may publish information, such as item listings or product description pages, on the networked system 102. In some embodiments, the selling engines 204 may comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines may also provide a number of features in support of these auction-format listings, such as a reserve price feature whereby a seller may specify a reserve price in connection with a listing and a proxy-bidding feature whereby a bidder may invoke automated proxy bidding. The selling engines 204 may further comprise one or more deal engines that support merchant-generated offers for products and services.

A listing engine 206 allows sellers to conveniently author listings of items or authors to author publications. In one embodiment, the listings pertain to goods or services that a user (e.g., a seller) wishes to transact via the networked system 102. In some embodiments, the listings may be an offer, deal, coupon, or discount for the good or service. Each good or service is associated with a particular category. The listing engine 206 may receive listing data such as title, description, and aspect name/value pairs. Furthermore, each listing for a good or service may be assigned an item identifier. In other embodiments, a user may create a listing that is an advertisement or other form of information publication. The listing information may then be stored to one or more storage devices coupled to the networked system 102 (e.g., databases 126). Listings also may comprise product description pages that display a product and information (e.g., product title, specifications, and reviews) associated with the product. In some embodiments, the product description page may include an aggregation of item listings that correspond to the product described on the product description page.

The listing engine 206 also may allow buyers to conveniently author listings or requests for items desired to be purchased. In some embodiments, the listings may pertain to goods or services that a user (e.g., a buyer) wishes to transact via the networked system 102. Each good or service is associated with a particular category. The listing engine 206 may receive as much or as little listing data, such as title, description, and aspect name/value pairs, that the buyer is aware of about the requested item. In some embodiments, the listing engine 206 may parse the buyer's submitted item information and may complete incomplete portions of the listing. For example, if the buyer provides a brief description of a requested item, the listing engine 206 may parse the description, extract key terms and use those terms to make a determination of the identity of the item. Using the determined item identity, the listing engine 206 may retrieve additional item details for inclusion in the buyer item request. In some embodiments, the listing engine 206 may assign an item identifier to each listing for a good or service.

In some embodiments, the listing engine 206 allows sellers to generate offers for discounts on products or services. The listing engine 206 may receive listing data, such as the product or service being offered, a price and/or discount for the product or service, a time period for which the offer is valid, and so forth. In some embodiments, the listing engine 206 permits sellers to generate offers from the sellers' mobile devices. The generated offers may be uploaded to the networked system 102 for storage and tracking.

Searching the networked system 102 is facilitated by a searching engine 208. For example, the searching engine 208 enables keyword queries of listings published via the networked system 102. In example embodiments, the searching engine 208 receives the keyword queries from a device of a user and conducts a review of the storage device storing the listing information. The review will enable compilation of a result set of listings that may be sorted and returned to the client device (e.g., device machine 110, 112) of the user. The searching engine 208 may record the query (e.g., keywords) and any subsequent user actions and behaviors (e.g., navigations, selections, or click-throughs).

The searching engine 208 also may perform a search based on a location of the user. A user may access the searching engine 208 via a mobile device and generate a search query. Using the search query and the user's location, the searching engine 208 may return relevant search results for products, services, offers, auctions, and so forth to the user. The searching engine 208 may identify relevant search results both in a list form and graphically on a map. Selection of a graphical indicator on the map may provide additional details regarding the selected search result. In some embodiments, the user may specify, as part of the search query, a radius or distance from the user's current location to limit search results.

The searching engine 208 may perform various function operable to search based on an image or a sketch. The image may be taken from a camera or imaging component of a client device or may be accessed from storage.

In a further example, a navigation engine 210 allows users to navigate through various categories, catalogs, or inventory data structures according to which listings may be classified within the networked system 102. For example, the navigation engine 210 allows a user to successively navigate down a category tree comprising a hierarchy of categories (e.g., the category tree structure) until a particular set of listing is reached. Various other navigation applications within the navigation engine 210 may be provided to supplement the searching and browsing applications. The navigation engine 210 may record the various user actions (e.g., clicks) performed by the user in order to navigate down the category tree.

FIG. 2 also illustrates a block diagram showing components provided within the sketch query system 123. The sketch query system 123 may include a user interface module 214 and an analysis module 216. All of the modules may communicate with each other, for example, via a network coupling, shared memory, and the like. It will be appreciated that each module may be implemented as a single module, combined into other modules, or further subdivided into multiple modules. Other modules not pertinent to example embodiments may also be included, but are not shown.

The user interface module 214 may provide various user interface functionality operable to cause presentation of information to the user 105. The user interface module 214 may communicate information, such as text, images, and the like, to another device operable to perform presentation of the communicated information. For example, the user interface module 214 may cause search results (e.g., listings on an e-commerce website) to be presented on client devices 110, 111, and 112. It will be appreciated that the user interface module 214 may provide many other user interfaces to facilitate functionality described herein.

The analysis module 216 may perform various functions to analyze and identify the inventory items based on the sketch received from the user. For example, the analysis module 216 may extract the item attributes from the sketch and perform an analysis to determine a set of inventory items similar to a search item. The analysis module 216 may perform analysis using a variety of techniques and schemes as is discussed in more detail below.

Additional modules and engines associated with the networked system 102 are described below in further detail. It should be appreciated that modules or engines may embody various aspects of the details described below.

Figure 3:
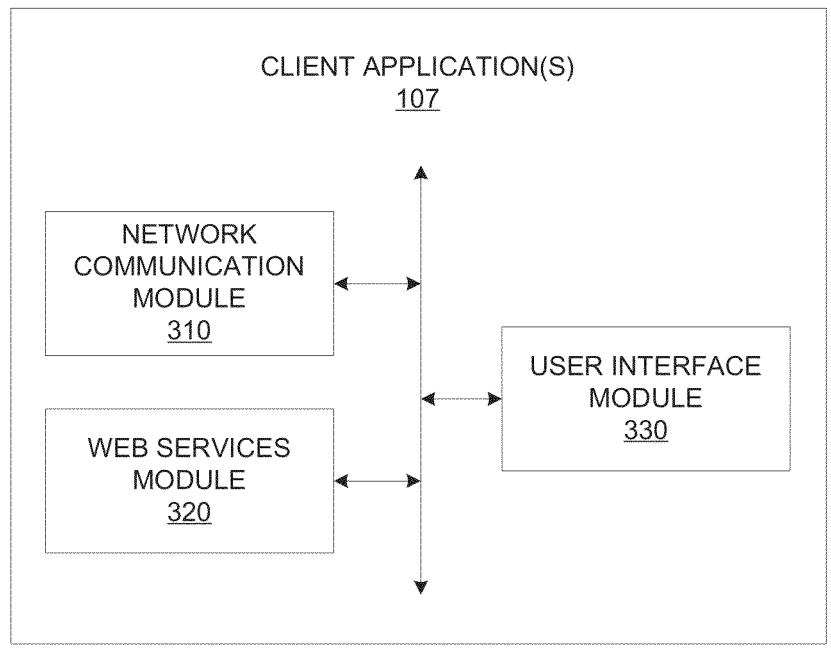
FIG. 3 is a block diagram depicting an example embodiment of a client application.

FIG. 3 is a block diagram of the client applications 107, which may provide a number of functions operable to receive sketches from the user and present the identified inventory items to the user. In an example embodiment, the client applications 107 may include a network communication module 310, a web services module 320, and a user interface module 330. All of the modules may communicate with each other, for example, via a network coupling, shared memory, and the like. It will be appreciated that each module may be implemented as a single module, combined into other modules, or further subdivided into multiple modules. Other modules not pertinent to example embodiments may also be included, but are not shown.

The network communication module 310 may perform various network communication functions such as communicating with networked system 102, the database servers 124, and the third party servers 130. Network communication may operate over any wired or wireless means to provide communication functionality.

The web services module 320 may perform various web services functions such as retrieving information from third party servers 130 and application servers 118. Information retrieved by the web services module 320 may include data associated with the user 105 (e.g., user profile information from an online account, social networking data associated with the user 105, and so forth), data associated with an item (e.g., images of the item, reviews of the item, and so forth), and other data.

The user interface module 330 may provide various user interface functionality operable to interactively present and receive information from the user 105. For example, the user interface module 330 may receive a sketch from the user, for example, via a touch screen display, a camera sensor operable to capture an image of the sketch (e.g., sketched on a piece of paper), and other means. Information may be presented using a variety of means including visually displaying information and using other device outputs (e.g., audio, tactile, and so forth). Similarly, information may be received by a variety of means including alphanumeric input or other device input (e.g., one or more touch screen, camera, tactile sensors, light sensors, infrared sensors, biometric sensors, microphone, gyroscope, accelerometer, other sensors, and so forth). It will be appreciated that the user interface module 330 may provide many other user interfaces to facilitate functionality described herein. Presenting may mean communicating information to another device that functionality operable to perform presentation using the communicated information. In some example embodiments, the user interface module 330 may provide sketching tools to the user as discuss in more detail below. The sketching tools may assist the user in generating the sketch.

Figure 4:
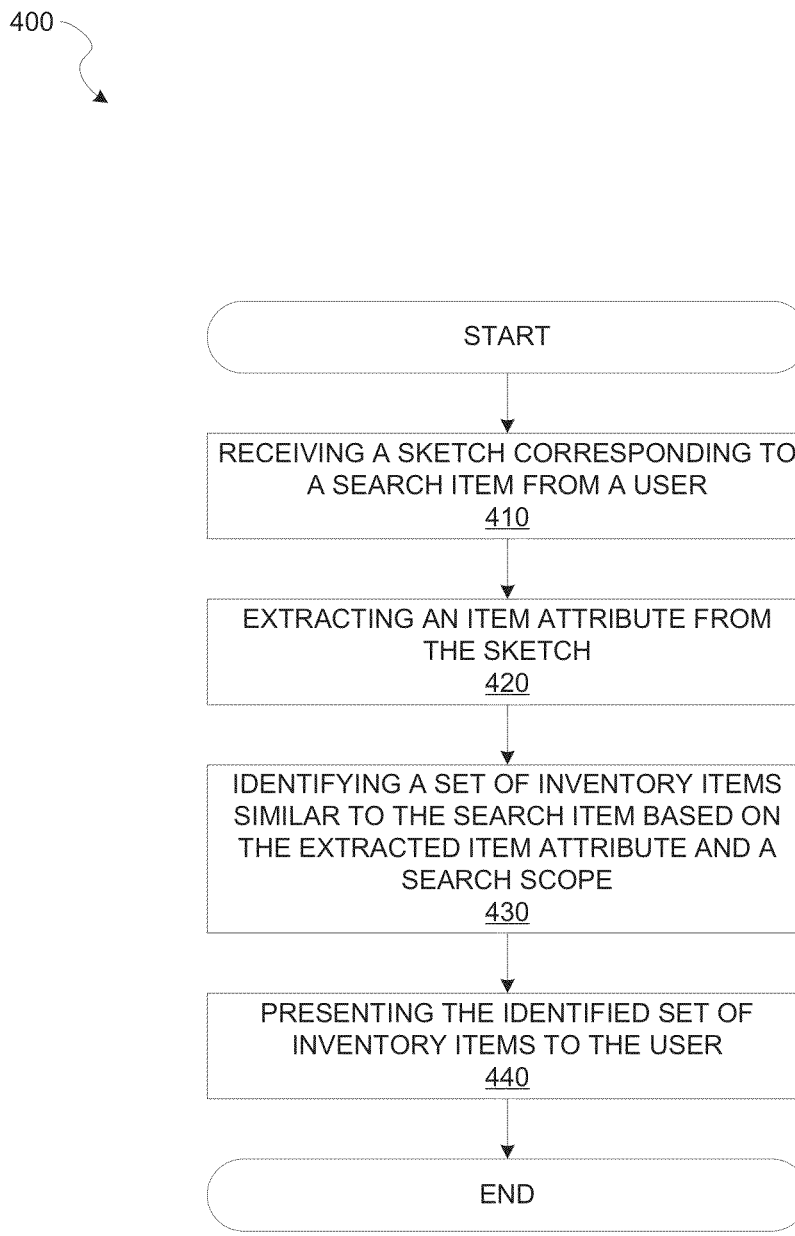
FIG. 4 is a flow diagram illustrating an example method for identifying inventory items from a sketch.

FIG. 4 is a flow diagram illustrating an example method 400 for identifying the set of inventory items similar to the search item from the sketch. The various operations of the method 400 may be performed by the sketch query system 123. At operation 410, the user interface module 214 may receive the sketch corresponding to a search item from the user. The search item may be an item the user may be looking to purchase, an item of information, or other item of interest to the user. For instance, the search item may be an apparel item, an electronics item, a sporting goods item, and so on. In some example embodiments, the sketch or portions of the sketch may be selected from attributes provided to the user by the sketch query system 123. In further example embodiments, the item category, relating to items of interest to the user, may be received from the user.

The sketch may be generated by the user and received in a variety of ways. For example, the user may generate the sketch via a touch screen display on a mobile device. In another example the user may draw the sketch on a sheet of paper and capture an image of the sketch using a camera sensor on a mobile device. In still another embodiment, the sketch may be generated by the user interacting with various device sensors. For example, a user gesture may be used to generate at least a portion of the sketch (e.g., a user gesture from the user detected using device accelerometers and gyroscopes or a user gesture detected using other sensors). In yet another example, the user may capture an image of an item or object (e.g., using a camera sensor on a mobile device), and in some instances modify the image, and provide the image as the sketch. In other examples, the sketch may be generated by starting with an existing image (e.g., image captured from camera, downloaded from the Internet, and so on) and the user annotating the image (e.g., by sketching on the image with a touch screen device). In this example, the annotated image may be modified by the sketch query system 123 and the modified image provided as the sketch.

The sketch may be an illustration of the search item, in some example embodiments. For instance, the sketch may depict or resemble a shirt and inventory items similar to the sketched shirt may be identified and presented to the user. In other example embodiments, the sketch may be an illustration of one or more item features, such as a pattern, logo, design, texture, ornamentation, shape, and the like. For instance, the sketch may be a particular logo or design on a shirt or other items, where a similar logo or design may be identified and presented to the user. In still other embodiments, the sketch may be a random doodle and items resembling the doodle may be identified and presented to the user. In further example embodiments, the sketch may be an illustration of the search item and include the item features. In still further example embodiments, the sketch may include multiple search items and multiple item features.

Sketching tools may be provided to the user by the client applications 107, in some example embodiments. The sketching tools may assist the user in generating the sketch. For instance, the sketching tools may be software (e.g., running on a mobile touch screen device) that provide the user with different illustration abilities, such as shape design tools, line drawing tools, patterning tools, material simulation tools, color palette tools, image importing tools, image editing tools, image processing functions, and the like. These sketching tools may assist the user to generate the sketch so that the sketch reflects the style or design the user may be seeking. Various item features and attributes may be provided to the user to assist in generating the sketch (e.g., patterns, colors, other item characteristics). In this embodiment, the various item features and attributes provided to the user may be related to the search item and determined based on an item category, user information (e.g., purchase history), what the user has sketch so far, and so forth. For instance, the user may have the option to place sleeve type, neckline, pockets or no pocket, buttons, zippers, other fasteners, and so on into the sketch.

At operation 420, the analysis module 216 may extract one or more item attributes from the sketch. The item attribute may correspond to a physical attribute of the search item (e.g., a physical characteristic such as shape, texture, pattern, design, and so on). The item attributes may include the item features as described above (e.g., pattern, logo, color, opening location, opening type, zipper location, fastener location, fastener style, and so on) and other attributes. FIGS. 12A and 12B depict example user interfaces for receiving the item features associated with the search item. In some example embodiments, the item category (e.g., shirts, handbags, and so on) may be extracted from the sketch, as further depicted in FIG. 7. FIG. 11 depicts example user interfaces for receiving the sketch from the user and presenting the extracted item category to the user.

The one or more item attributes may be extracted from the sketch using a variety of schemes and techniques. For instance, edges may be extracted at multiple scales using, for example, the Canny edge detector. Different regions of the sketch may be labeled (e.g., for a sketch of a handbag, an isolated loop may be treated as a handle and the largest connection region may be treated as the body of the bag). In other example embodiments, the sketch, or portions of the sketch, may be compared to images of known items or with known features. In this example embodiment, an image that matches or nearly matches the sketch may be identified and information associated with the matching image may be used to determine the item attributes. For a specific example, if the sketch is of a shirt, the sketch may be compared to known objects images (e.g., a set of common object sketches) and at a coarse level and the sketch may recognized as a shirt. Attributes such as sleeve type, neckline, pocket or no pocket, buttons, fasteners, and other attributes may be extracted. In further example embodiments, once a coarse, high-level, match is made, further images may be compared with the sketch to further determine features and ascertain additional information related to the sketch.

In some example embodiments, non-visual information may be used to extract and identify item attributes from the sketch. For example, if the sketch is generated on a touch screen display, the sequence of the sketching may be used to extract attributes (e.g., the user may create a full loop with one stroke and this loop may indicate a feature of the sketch features). Other non-visual information may be used, such as the tactile pressure applied while sketching on a touch screen display, information from accelerometers, gyroscopes, temporal information (e.g., when certain characteristics or features where added to the sketch), and so on.

At operation 430, the analysis module 216 may identify a set of inventory items similar to the search item based on the extracted attribute and a search scope. The set of inventory items may, for example, be inventory items listed on an e-commerce website for sale. For instance, the inventory items may be stored in the databases 126 and accessed by communicating with the publication system 120. In some example embodiments, item information that corresponds with each of the inventory items may be accessed from the databases 126. The item information may include item images, descriptions, categories the item belongs to, reviews of the item, availability, seller information, price, and so on.

In an example embodiment, the extracted attributes may be mapped to attribute text. The set of inventory items similar to the search item may be identified by searching for inventory items using the attribute text. For example, a particular extracted attribute may be a fastener type, such as a fabric covered button. The extracted attribute may be converted to related attribute text, such as "fabric covered button." The attribute text may then be used to identify similar search items.

In further example embodiments, the extracted attributes may be mapped to inventory item features. The mapped inventory item features may be used to identify inventory items similar to the search item. For example, a particular extracted attribute may be a neckline opening in the shape of a v. The neckline opening may be mapped to a particular inventory item feature, such as neckline, v-neck, or similar inventory item feature. The inventory item feature may then be used to identify inventory items similar to the search term.

In some example embodiments (as will be discussed in connection with FIG. 6), the set of inventory items may be identified by comparing the item attributes extracted from the sketch with image attributes extracted from images corresponding to inventory items included in the set of inventory items. In other example embodiments, the set of inventory items may be identified by searching for inventory items associated with the search scope or the extracted item features. For example, the sketch may illustrate a shirt with a particular neckline (e.g., a v shaped neck or v-neck). The neckline feature may be extracted by the sketch query system 123 at operation 420. At operation 430, the analysis module 216 may determine information associated with the item feature. The set of inventory items may be identified based on the information associated with the item feature. In this example, shirts with v-shaped necks or a similar neckline may be identified and included in the set of inventory items (e.g., search for v-neck, v-shaped neck, and other similar or related search terms).

Figure 7:
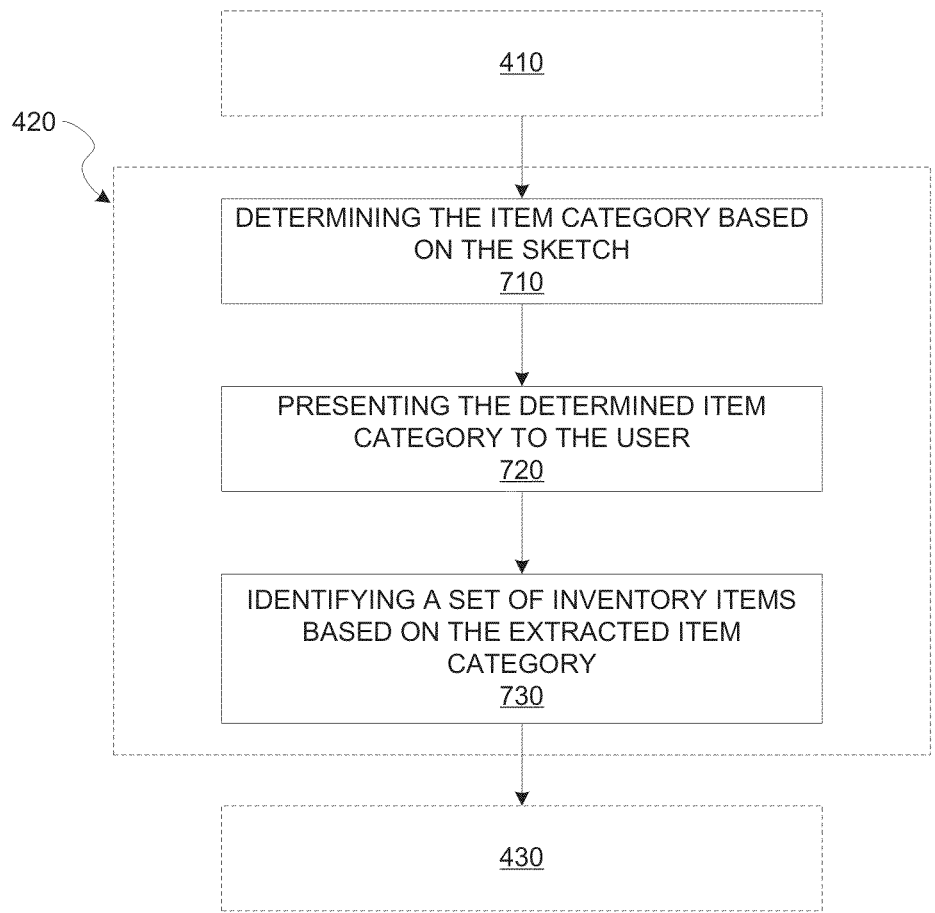
FIG. 7 is a flow diagram illustrating an example method for determining an item category based on a sketch.

The search scope may include at least one of item categories, item features, and other criteria. The set of inventory items may be identified according to the search scope. For example, if the item category is handbags and the search scope includes the item category, the search results may include different types of handbags. In another example, the search scope may include the item category and one or more item features. For a specific example, the item category may be a handbag and the item feature may be a particular style of handbag opening. The search scope may include many different combinations of items categories and item features. In some example embodiments, as depicted in FIG. 7, the item category may be extracted from the sketch. In other example embodiments, the user may specify the item category (e.g., received from the user via a user interface configured to receive the item category) to include in the search scope.

The set of inventory items may be identified using the one or more extracted item attributes. For example, inventory items with related or similar item attributes may be identified and included in the set of inventory items. As described above, a search scope may confine the search to a particular scope (e.g., an item category). For a specific example, the search scope may include handbags as the item category and the extracted attributes may include a particular handle shape. In this specific example, handbags with a related or similar handle shape may be identified and included in the set of inventory items.

While example embodiments describe retrieving inventory using a sketch-based query, alternative embodiments may contemplate using similar operates to retrieve other search results using a sketch-based query. For example, queries may be made for informational publications using a sketch-based query by using similar systems and methods as described herein.

At operation 440, the user interface module 214 may provide the identified set of inventory items to the user for presentation. The identified set of inventory items may be presented to the user in a variety of ways. In an example embodiment, the set of inventory items may simply be listed. In further embodiments, additional information associated with each inventory item may be presented to the user (e.g., images, description, price, brand, availability, and the like). The set of inventory items may include item listings for sale (e.g., item listings on an e-commerce website). As will be discussed in more detail in FIG. 8, the inventory items may be sorted by similarity to the search item. In further example embodiments, the inventory items may be presented in a sorted order by relevancy or other criteria.

Figure 5:
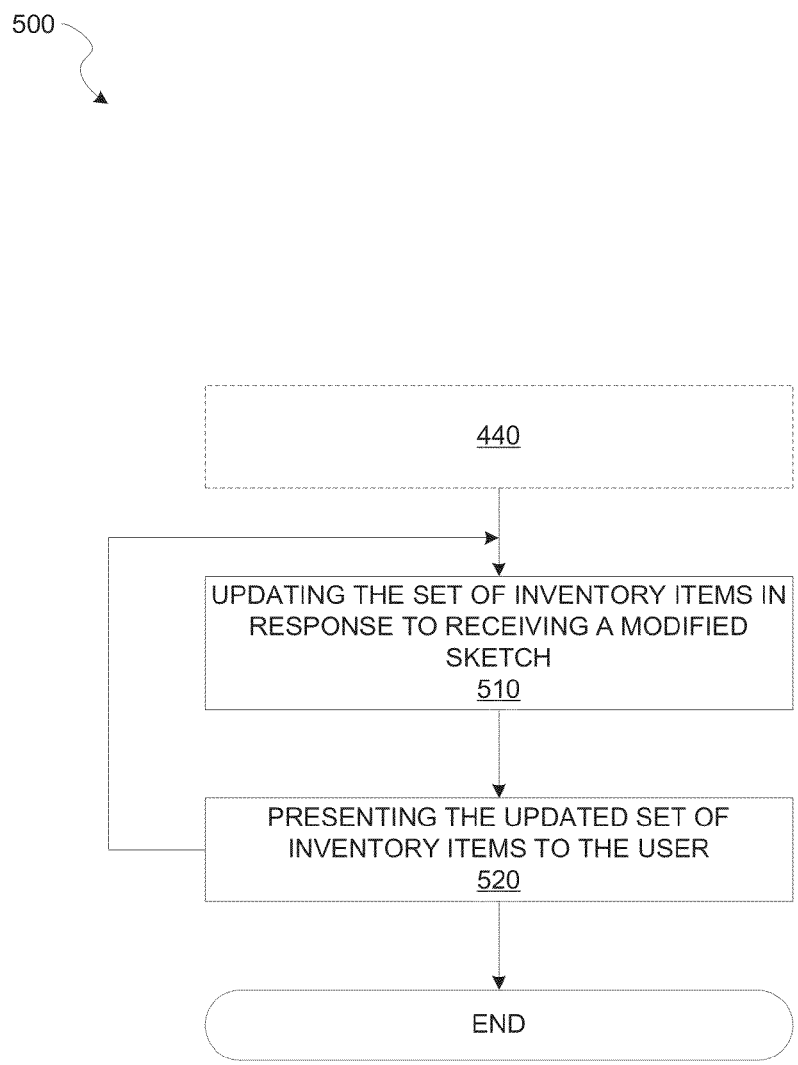
FIG. 5 is a flow diagram further illustrating example method for updating inventory items in response to receiving a modified sketch.

FIG. 5 is a flow diagram illustrating an example method 500 for updating inventory items. At operation 510, the analysis module 510 may update the set of inventory items in response to receiving a modified sketch. For example, the user may sketch an additional item feature, remove an item feature, move an item feature, or cause other modifications of the sketch. In response to the user modifying the sketch, the sketch query system 123 may update the set of inventory items. The updating the set of inventory items may include removing inventory items from the set of inventory items, adding inventory items to the set of inventory items, a combination of both, and the like. In some example embodiments, the set of inventory items may be updated while the user is modifying the sketch (e.g., while the user is sketching on a touch screen display).

At operation 520, the user interface module 214 may present the updated set of inventory items to the user. Similar to the operation 440, the updated set of inventory items may be presented to the user in a variety of ways. In some example embodiments, the user may be provided an indication of the update or an indication of the how the set of inventory items has been updated.

Figure 6:
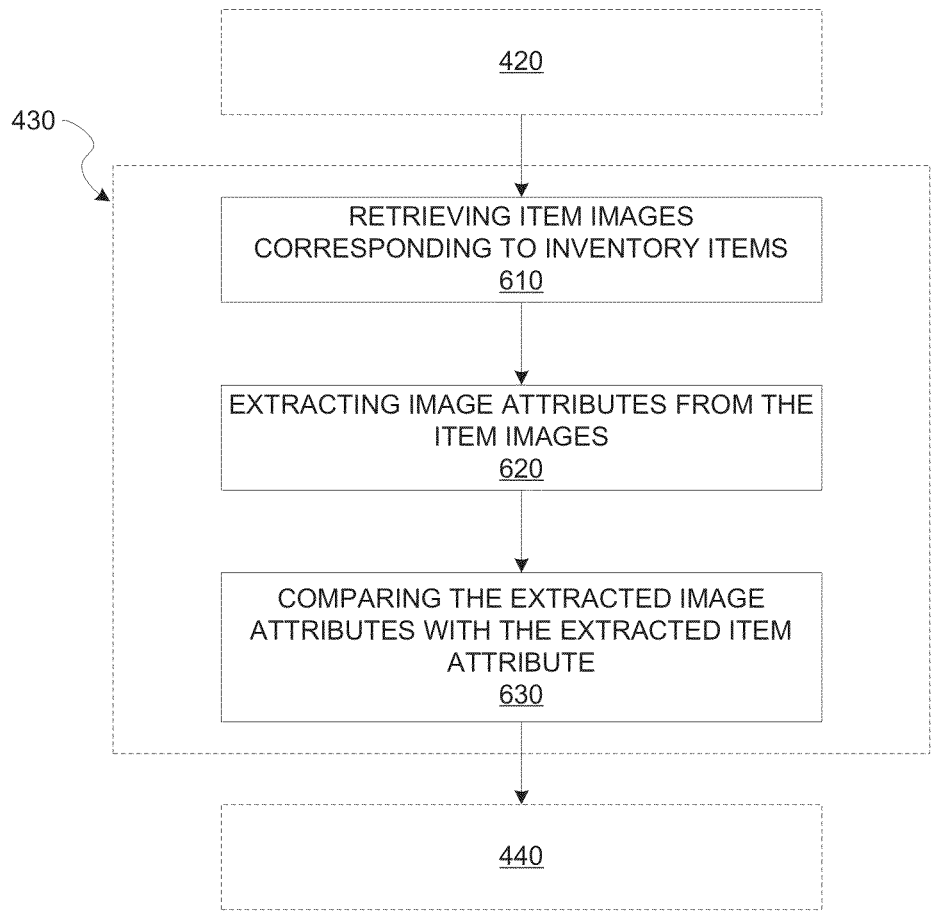
FIG. 6 is a flow diagram illustrating an example method for identifying inventory items using inventory item images.

FIG. 6 is a flow diagram depicting further example operations for identifying the set of inventory items (operation 430). In further example embodiments, the operation 430 may identify the inventory items using inventory item images. At operation 610, the analysis module 216 may retrieve item images corresponding to inventory items. For example, the item images may be stored in the databases 126 accessible via the publication systems 120.

At operation 620 the analysis module 216 may extract the image attributes from the item images. Similar to the operation 420, the image attributes may be extracted from the item image using a variety of techniques.

At operation 630 the analysis module 216 may compare the extracted image attributes with the extracted item attributes. In some example embodiments, image attributes from more than one of the item images may be compared with the extracted item attributes. The set of inventory items similar to the search item may be identified based on comparing the extracted image attributes with the extracted item attributes. For example, the sketch may illustrate a handbag with a particular handle shape. Various handbags inventory items, including item images corresponding to the various handbags, may be retrieved. The particular handle shape of the sketch may be compared with the handle shape of the various handbags. Based on the similarity between the handle shape of the sketch and the handle shape of the various handbags, the handbag may be included in the set of inventory items. Many schemes and techniques may be employed to compare the sketch with the item images.

FIG. 7 is a flow diagram depicting alternative example operations for identifying the set of inventory items (operation 420). At operation 710, the analysis module 216 may determine the item category based on the sketch. In an example embodiment, the item category may be extracted from the sketch by comparing the sketch to known objects (e.g., a dictionary of objects with a illustration for each object). If the sketch matches or nearly matches an illustration of a known object, the sketch may be associated with the known object. Many schemes and techniques may be employed to determine the item category based on the sketch.

At operation 720, the user interface module 214 may present the extracted item category to the user. The item category may be indicated to the user using a variety of schemes and techniques. For instance, the item category may be presented as text, a representative image of the category, and so on.

At operation 730, the analysis module 216 may identify the set of inventory items based on the extracted items category. For instance, inventory items related or associated with the item category may be identified and presented to the user.

Figure 8:
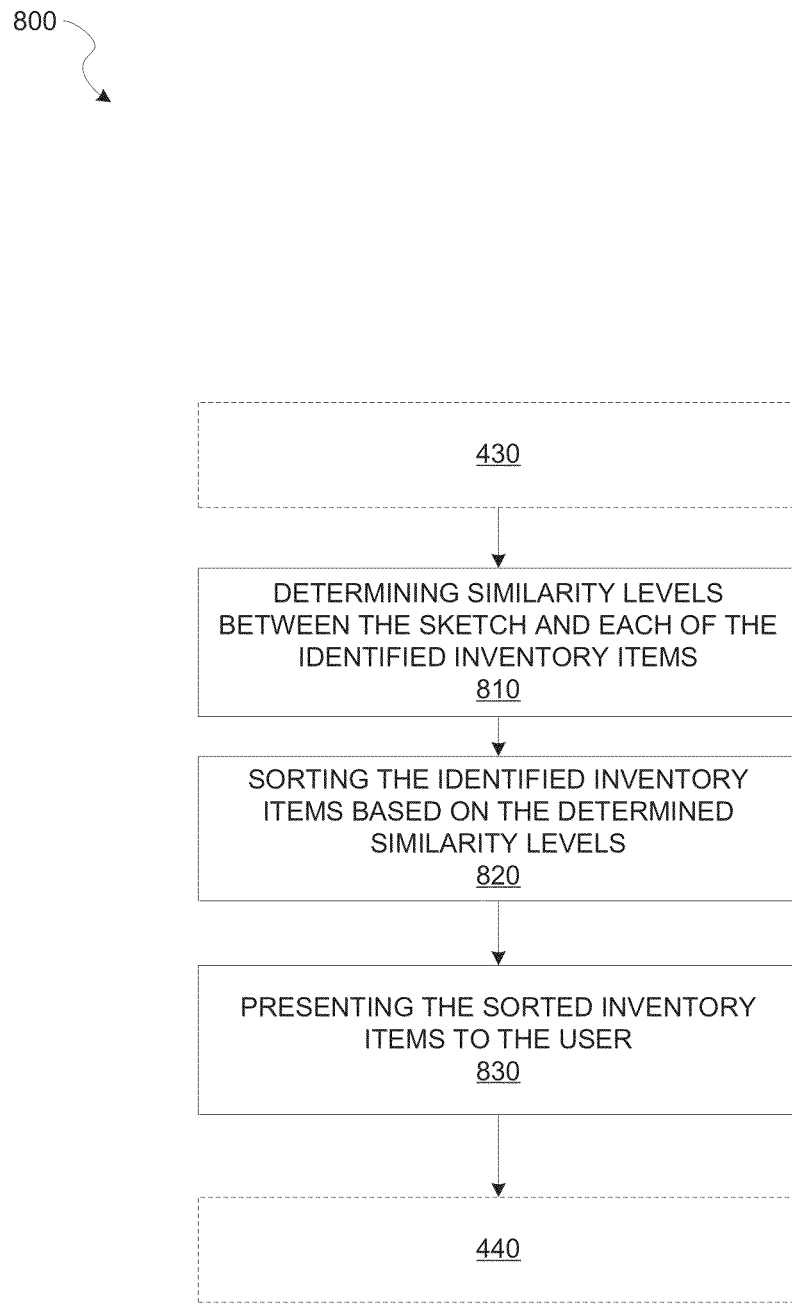
FIG. 8 is a flow diagram illustrating an example method for sorting identified inventory items.

FIG. 8 is a flow diagram illustrating an example method 800 for sorting identified inventory items. The operations of the method 800 may be performed by components of the sketch query system 123. At operation 810, the analysis module 216 may determine similarity levels between the sketch and each of the identified inventory items. The similarity level may be a metric that indicates the likeness of the sketch as compared to the item images corresponding to the identified inventory items.

At operation 820, the analysis module 216 may sort the identified inventory items based on the determined similarity levels. In other example embodiments, the inventory items may be sorted based on other criteria or a combination of criteria, such as, information associated with the inventory items (e.g., price, availability, and so forth).

At operation 830, the user interface module 214 may provide the sorted inventory items to the user for presentation. For example, the sorted inventory items may be displayed in a list with images and text associated with each inventory item.

Figure 9:
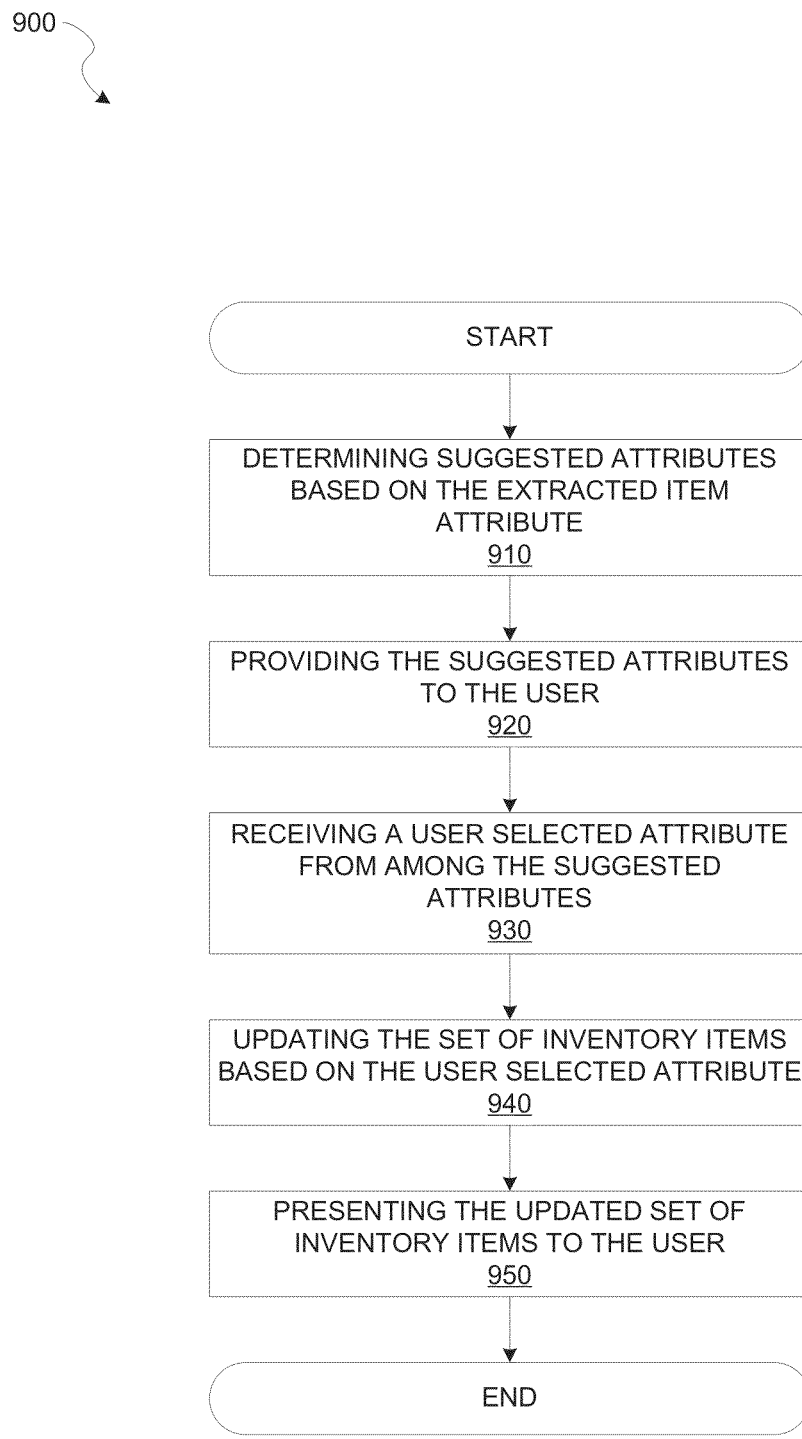
FIG. 9 is a flow diagram illustrating an example method for providing a selection of suggested attributes to the user.

FIG. 9 is a flow diagram illustrating an example method 900 for providing a selection of suggested attributes to the user. At operation 910, the analysis module 216 may determine suggested attributes based on the extracted item attributes. A variety of information may be used to determine the suggested attributes. For example, the item category, the item attributes, the user information, and other information may be used to determine the suggested attributes. For a specific example, if the item category for the sketch has been determined to be shirts, various shirt attributes may be determined (e.g., various neckline styles, various colors, and so on). In another specific instance, the item attributes extracted from the sketch may include a pocket type, and based on this particular extracted item attribute, a particular fastener type to match the pocket type may be included in the suggested attributes. In further example embodiments, user information may be used to determine suggested attributes. For example, if the user information includes purchase history, various styles and preferences associated with the user may be determined based on the purchase history and attributes associated with those preferences may be included in the suggested attributes. In another example, available attributes for a particular item may be included in the suggested attributes. For example, if the search item is a handbag, all available handbag opening types may be included in the suggested attributes. Many schemes and techniques may be employed to determine the suggested attributes.

At operation 920, the user interface module 214 may provide the suggested attributes to the user. For example, the suggested attributes may be presented in a visual listing with a representative image corresponding to each of the suggested attributes. In other embodiments, text may be employed to convey the suggested attributes to the user.

At operation 930, the user interface module 214, may receive a user selected attribute from among the suggested attributes. For instance, the user may tap on a particular suggested attribute to denote that the suggested attribute is selected. In another instance, the user may drag and drop a particular suggested attribute to a particular location on the sketch to denote the suggested attribute is selected and the location where the suggested attribute is to be associated with the sketch. Many techniques may be employed to receive the user selected attribute from among the suggested attributes.

In further example embodiments, attribute selection criteria may be used to validate the user selected attribute. For instance, some attributes may be incompatible or mutually exclusive of other attributes. In this instance, the suggested attribute criteria may include a criterion to prevent such a selection among the suggested attributes. Many other criteria may be included in the attribute selection criteria (e.g., color matching schemes, style matching schemes, and so on).

At operation 940, the analysis module 216 may update the set of inventory items based on the user selected attribute. For example, in response to the user selecting a particular suggested attribute, the set of inventory items may be updated to include inventory items with the user selected attribute and may not include inventory items without the user selected attribute.

At operation 950, the user interface module 214 may provide the updated set of inventory items to the user. Similar to the operation 520, the updated set of inventory items may be presented to the user in a variety of ways. In some example embodiments, the user may be provided an indication of the update or an indication of the how the set of inventory items has been updated.

FIGS. 10A, 10B, and 10C depicts example user interfaces for receiving the sketch and determining similar inventory items based on the sketch. FIG. 10A depicts an example user device 1005 displaying an example sketch 1010 of the search item, in this example a handbag. The user may provide the sketch, for example, using a touch screen display on a mobile device. User interface element 1015 may be the set of inventory items identified and retrieved in response to the user providing the example sketch 1010. As described above, the set of inventory items may be similar to the example sketch 1010. User interface element 1020 may be sketching tools to assist the user in sketching the search item. As described above, various tools may be provided to the user. In this example embodiment, the user interface element 1020 may include a color palette, a color filling tool, an eraser, and a view zooming function.

FIG. 10B depicts an example user device 1025 displaying an example sketch 1030 that is similar to the example sketch 1010, but with an additional feature sketch by the user. In this example, the user has sketched a handle on the handbag. User interface element 1035 may present an updated set of inventory items that includes inventory items similar to the example sketch 1030. User interface element 1040, similar to user interface element 1020, may include sketching tools to assist the user in sketching the search item. The sketching tools may be updated in response to the user modifying the sketch.

FIG. 10C depicts an example user device 1045 displaying a further example sketch 1050. The example sketch 1050 includes additional item features sketched by the user. Similar to the user interface element 1015 and the user interface element 1035, user interface element 1055 may present the set of inventory items similar to the search item. In this example, the set of inventory items may include a particular opening or type of stitching. User interface element 1060 may include tools to assist the user in sketching the search item and may include suggested attributes related to the search item.

Figure 11A:
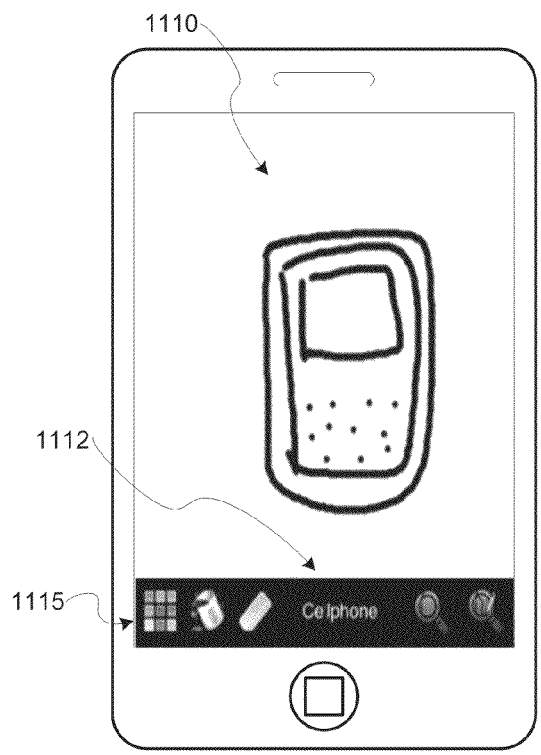
FIGS. 11A, 11B, 11C, and 11D depicts example user interfaces for determining the item category from the sketch.

FIGS. 11A, 11B, 11C, and 11D depicts example user interfaces for determining the item category from the sketch as discussed in the method 700 of FIG. 7. FIG. 11A depicts user interface 1110 displaying an example sketch of a cellphone. As described in the discussion of FIG. 7, the sketch query system 123 may determine the item category from the sketch and present the item category to the user. In this example, the user interface element 1115 may include a textual description 1112 of the item category, such as cellphone.

Figure 11B:
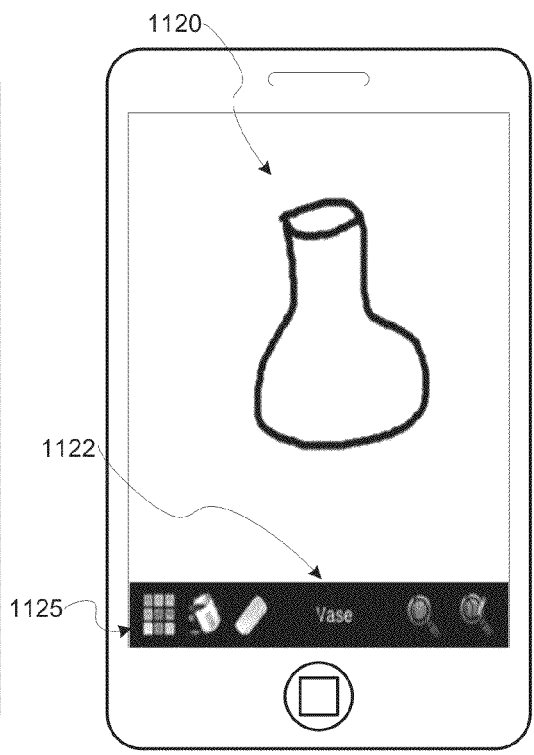

FIG. 11B depicts user interface 1120 displaying an example sketch of a vase. In this example, the sketch query system 123 may determine that the sketch is similar to or related to the item category of vases and display the item category in user interface element 1125, such as textual description 1122.

Figure 11C:
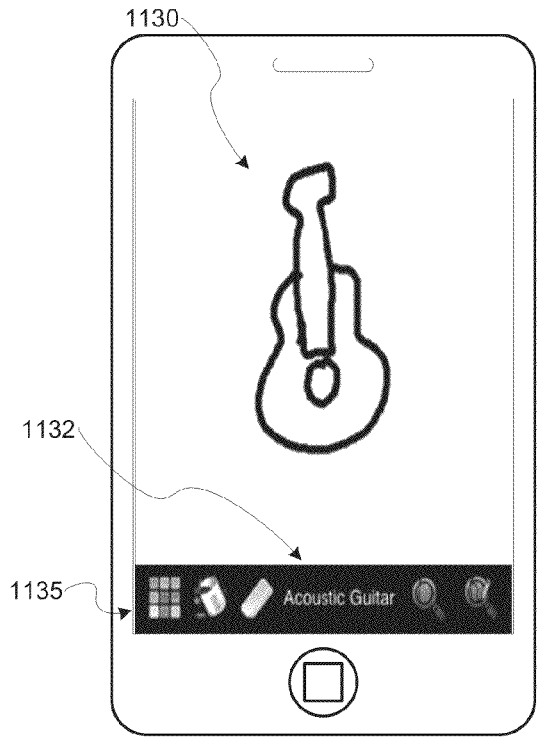

FIG. 11C depicts user interface 1130 displaying an example sketch of an acoustic guitar. In this example, the sketch query system 123 may determine that the sketch is similar to or related to the item category of acoustic guitars and display the item category in user interface element 1135, such as textual description 1132.

Figure 11D:
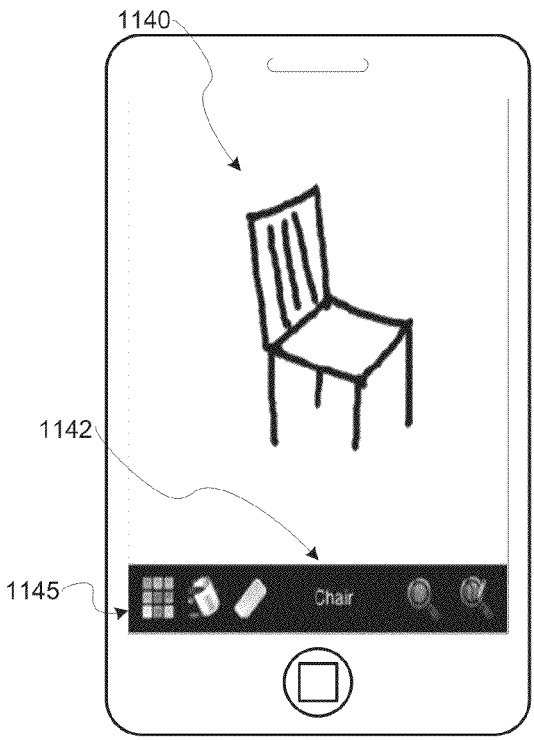

FIG. 11D depicts user interface 1140 displaying an example sketch of a char. In this example, the sketch query system 123 may determine that the sketch is similar to or related to the item category of chars and display the item category in user interface element 1145, such as textual description 1142.

FIGS. 12A and 12B depict example user interfaces having a sketch query for an item in a particular item category. Example user device 1200 may depict a logo or design, such as user interface element 1210. In response to the user sketching a logo or design, the sketch query system 123 may identify inventory items that include the same or similar logo. The search scope may be used to confine the inventory items identified and presented to the user to a particular item category. In this example, the item category may be t-shirts. User interface element 1220 may present t-shirts with the same or similar logo as depicted by the user interface element 1210.

In another example, user device 1240 may depict another example design or pattern, such as user interface element 1250. In this example, the design may be a pine tree. The sketch query system 123 may identify inventory items with a pine tree or inventory items related to pine trees. If the search scope includes a particular item category, the identified inventory items may be confined to that item category. In this example, the search scope may be apparel and user interface element 1260 may present apparel with a pine tree design or apparel that may be related to pine trees or similar trees and plants. In another example embodiment, the sketch may be related to a particular theme, such as holidays (e.g., Christmas). In this example, inventory items related to the theme or inventory items with a particular color scheme that is related to the theme may be presented to the user (e.g., red and green apparel for Christmas, and so on).

Figure 13:
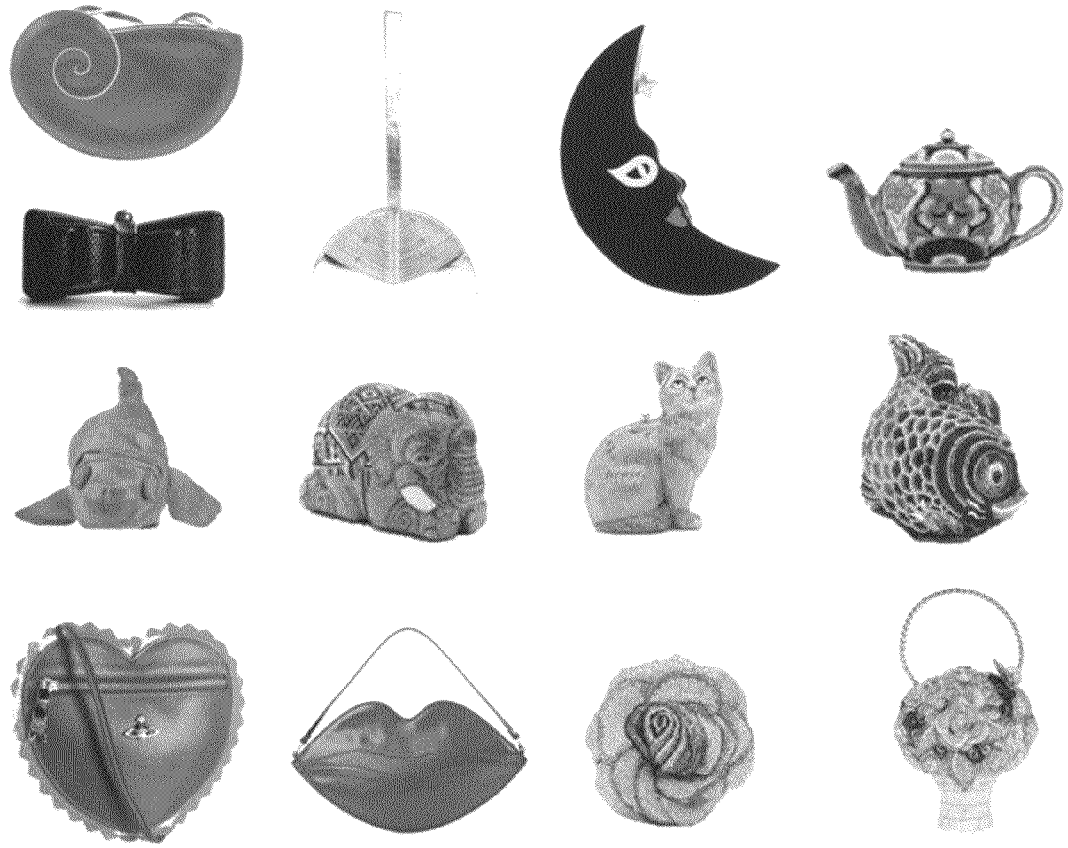
FIG. 13 depicts example images of various example handbags with uncommon shapes.

FIG. 13 depicts images of various example handbags with uncommon shapes. The situation where the user may be seeking an uncommon shape is particularly interesting since the sketch query system 123 may provide the user with many advantages over a traditional text based query. The user may creatively sketch a particular shape or style, that may be difficult to convey in text form, and the sketch query system 123 may identify inventory items with the same or similar shape and present the identified inventory items to the user.

FIGS. 14A, 14B, 14C, and 14D depict example embodiments of identifying image attributes from images. In these examples, the items may be handbags. The original image of the handbags may be modified and manipulated in various ways to extract attributes. FIGS. 14A, 14B, 14C, and 14D depict various examples of different stages or steps that may be included in the method to extract attributes from the original image. The steps for parsing shape related information from images may include extracting edges at multiple scales using, for example, a Canny edge detector. Different regions of the bag may be label, for example, isolated loops may be treated as handles, the largest connected region may treated as the body, and so on. For example, FIG. 14A depicts an example of large scale edges, from which the general shape of the handbag and other attributes may be extracted. FIG. 14B depicts an example of small scale edges, from which more detailed attributes may be extracted (e.g., stitching, patterning, and the like). FIG. 14C depicts a mask that may be used in various manipulations used to extract attributes from an image. FIG. 14D depicts a combination of FIGS. 14A, 14B, and 14C. The combination may be useful in further extracting attributes from the image. Many different scheme and techniques may be employed to extract attributes from images and the above are merely non-limiting examples.

Modules, Components, and Logic

Figure 15:
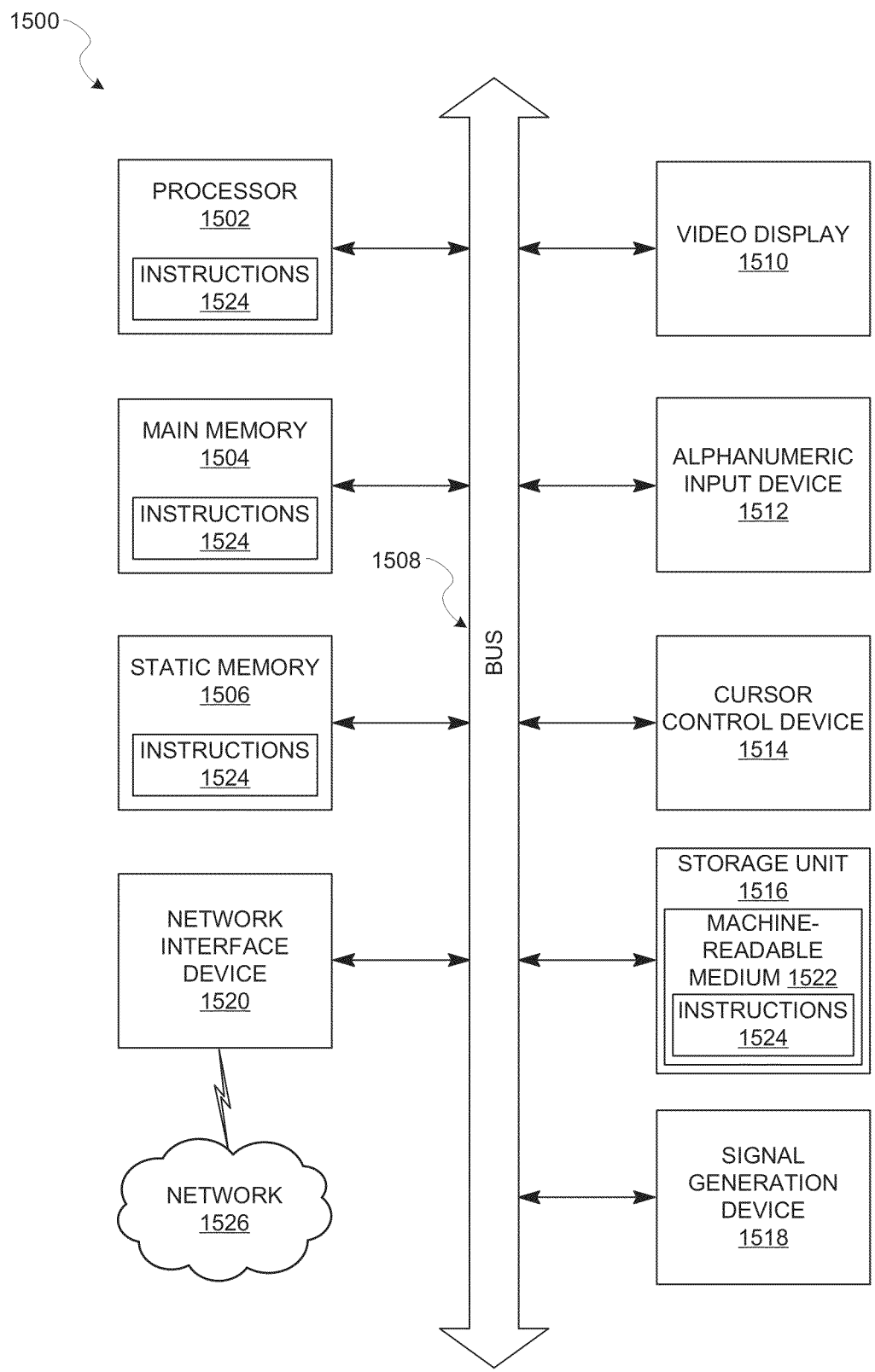
FIG. 15 illustrates a diagrammatic representation of a machine in the form of a computer system within which a set of instructions, for causing the machine to perform any one or more of the methodologies discussed herein, may be executed, according to an example embodiment.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically. FIG. 15 shows a diagrammatic representation of the machine 1500 in the example form of a computer system, within which instructions 1524 (e.g., software, a program, an application, an applet, an app, or other executable code) for causing the machine 1500 to perform any one or more of the methodologies discussed herein may be executed. In alternative embodiments, the machine 1500 operates as a standalone device or may be connected (e.g., networked) to other machines. In a networked deployment, the machine 1500 may operate in the capacity of a server machine or a client machine in a server-client network environment, or as a peer machine in a peer-to-peer (or distributed) network environment. The machine 1500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1524, sequentially or otherwise, that specify actions to be taken by that machine. Further, while only a single machine 1500 is illustrated, the term "machine" shall also be taken to include a collection of machines 1500 that individually or jointly execute the instructions 1524 to perform any one or more of the methodologies discussed herein.

The machine 1500 includes a processor 1502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1504, and a static memory 1506, which are configured to communicate with each other via a bus 1508. The machine 1500 may further include a video display 1510 (e.g., a plasma display panel (PDP), a light emitting diode (LED) display, a liquid crystal display (LCD), a projector, or a cathode ray tube (CRT)). The machine 1500 may also include an alphanumeric input device 1512 (e.g., a keyboard), a cursor control device 1514 (e.g., a mouse, a touchpad, a trackball, a joystick, a motion sensor, or other pointing instrument), a storage unit 1516, a signal generation device 1518 (e.g., a speaker), and a network interface device 1520.

The storage unit 1516 includes a machine-readable medium 1522 on which is stored the instructions 1524 embodying any one or more of the methodologies or functions described herein. The instructions 1524 may also reside, completely or at least partially, within the main memory 1504, within the static memory 1506, within the processor 1502 (e.g., within the processor's cache memory), or both, during execution thereof by the machine 1500. Accordingly, the main memory 1504, static memory 1506 and the processor 1502 may be considered as machine-readable media 1522. The instructions 1524 may be transmitted or received over a network 1526 via the network interface device 1520.

As used herein, the term "memory" refers to a machine-readable medium 1522 able to store data temporarily or permanently and may be taken to include, but not be limited to, random-access memory (RAM), read-only memory (ROM), buffer memory, flash memory, and cache memory. While the machine-readable medium 1522 is shown in an example embodiment to be a single medium, the term "machine-readable medium" should be taken to include a single medium or multiple media (e.g., a centralized or distributed database, or associated caches and servers) able to store instructions 1524. The term "machine-readable medium" shall also be taken to include any medium, or combination of multiple media, that is capable of storing instructions (e.g., instruction 1524) for execution by a machine (e.g., machine 1500), such that the instructions, when executed by one or more processors of the machine 1500 (e.g., processor 1502), cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium 1522 is non-transitory in that it does not embody a propagating signal. However, labeling the machine-readable medium 1522 as "non-transitory" should not be construed to mean that the medium is incapable of movement; the medium should be considered as being transportable from one physical location to another. Additionally, since the machine-readable medium 1522 is tangible, the medium may be considered to be a machine-readable device.

The instructions 1524 may further be transmitted or received over a communications network 1526 using a transmission medium via the network interface device 1520 and utilizing any one of a number of well-known transfer protocols (e.g., hypertext transfer protocol (HTTP)). Examples of communication networks include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 1524 for execution by the machine 1500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 1522 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor 1502, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1502 that are temporarily configured (e.g., by software) or permanently configured to perform the relevant operations. Whether temporarily or permanently configured, such processors 1502 may constitute processor-implemented modules that operate to perform one or more operations or functions described herein. As used herein, "processor-implemented module" refers to a hardware module implemented using one or more processors 1502.

Similarly, the methods described herein may be at least partially processor-implemented, with a processor 1502 being an example of hardware. For example, at least some of the operations of a method may be performed by one or more processors 1502 or processor-implemented modules. Moreover, the one or more processors 1502 may also operate to support performance of the relevant operations in a "cloud computing" environment or as a "software as a service" (SaaS). For example, at least some of the operations may be performed by a group of computers (as examples of machines 1500 including processors 1502), with these operations being accessible via a network 1526 (e.g., the Internet) and via one or more appropriate interfaces (e.g., an application program interface (API)).

The performance of certain of the operations may be distributed among the one or more processors 1502, not only residing within a single machine 1500, but deployed across a number of machines 1500. In some example embodiments, the one or more processors 1502 or processor-implemented modules may be located in a single geographic location (e.g., within a home environment, an office environment, or a server farm). In other example embodiments, the one or more processors 1502 or processor-implemented modules may be distributed across a number of geographic locations.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
    at least one processor of a machine;
    a hardware-implemented user interface module to receive, from a user device of a user, a sketch that corresponds to a search item, the sketch being at least partially generated by the user physically interacting with the user device, the search item being a physical product of interest to the user; and
    a hardware-implemented analysis module, executable by the at least one processor, to:
        extract an item attribute from the sketch, the item attribute corresponds to a first physical attribute of the search item,
        identify a set of inventory items similar to the search item based on the extracted item attribute and a search scope, the set of inventory items corresponds to an available stock of physical products,
        retrieve a purchase history of the user,
        determine a user preference based on the purchase history,
        identify a suggested attribute based at least in part on the extracted item attribute and the determined user preference, the suggested attribute corresponds to a second physical attribute of the search item,
    the hardware-implemented user interface module further to:
        provide the user with an option on a user interface of the user device to select the suggested attribute;
        receive a user selection of the suggested attribute from the user device;
        apply the selected suggested attribute to the sketch;
    the hardware-implemented analysis module further to update the set of inventory items based on the selected suggested attribute; and
    the hardware-implemented user interface module further to cause presentation of the updated set of inventory items on the user interface of the user device.

2. The system of claim 1, wherein the hardware-implemented analysis module is to:
    map the extracted item attribute to attribute text; and
    identify the set of inventory items similar to the search item based on the attribute text.

3. The system of claim 1, wherein the hardware-implemented analysis module is to:
    map the extracted item attribute to inventory item features; and
    identify the set of inventory items similar to the search item based on the inventory item features.

4. The system of claim 1, wherein the hardware-implemented analysis module is to:
    retrieve item images corresponding to inventory items;
    extract image attributes from the item images; and
    compare the extracted image attributes with the extracted item attribute to identify the set of inventory items similar to the search item.

5. The system of claim 1, wherein:
    the hardware-implemented user interface module is to receive a modified sketch from the user device, the modified sketch being a modification of the sketch; and
    in response to receiving the modified sketch, the hardware-implemented analysis module is to update the set of inventory items.

6. The system of claim 5, wherein:
    the hardware-implemented user interface module is to receive multiple iterations of the modified sketch from the user;
    the hardware-implemented analysis module is to update the set of inventory items in response to receiving the multiple iterations; and
    the hardware-implemented user interface module is to cause presentation of the updated set of inventory items to the user for each iteration of the modified sketch as each iteration of the modified sketch is received from the user.

7. The system of claim 1, wherein the analysis module is to validate the user selection of the suggested attribute according to selection criteria, wherein the selection criteria includes at least one of a compatibility criterion, a color criterion, or a style criterion.

8. A method comprising:
    receiving a sketch corresponding to a search item from a user device of a user, the sketch being at least partially generated by the user physically interacting with the user device, the search item being a physical product of interest to the user;
    extracting an item attribute from the sketch, the item attribute corresponding to a first physical attribute of the search item;
    identifying, using a hardware processor, a set of inventory items similar to the search item based on the extracted item attribute and a search scope, the set of inventory items corresponding to an available stock of physical products;
    retrieving a purchase history of the user;
    determining a user preference based on the purchase history;
    identifying a suggested attribute based at least in part on the extracted item attribute and the determined user preference, the suggested attribute corresponding to a second physical attribute of the search item;
    providing the user with an option on a user interface of the user device to select the suggested attribute;

receiving a user selection of the suggested attribute;
applying the selected suggested attribute to the sketch;
updating the set of inventory items based on the selected suggested attribute; and
causing presentation of the updated set of inventory items on the user interface of the user device.

9. The method of claim 8, further comprising:
mapping the extracted item attribute to attribute text; and
identifying the set of inventory items similar to the search item based on the attribute text.

10. The method of claim 8, further comprising:
mapping the extracted item attribute to inventory item features; and
identifying the set of inventory items similar to the search item based on the inventory item features.

11. The method of claim 8, further comprising:
retrieving item images corresponding to inventory items;
extracting image attributes from the item images; and
comparing the extracted image attributes with the extracted item attribute to identify the set of inventory items similar to the search item.

12. The method of claim 8, further comprising:
receiving a modified sketch from the user device, the modified sketch being a modification of the sketch; and
in response to receiving the modified sketch, updating the set of inventory items.

13. The method of claim 12, further comprising:
receiving multiple iterations of the modified sketch from the user; and
updating the set of inventory items in response to the receiving the multiple iterations; and
causing presentation of an updated set of inventory items to the user for each iteration of the modified sketch as each iteration of the modified sketch is received from the user.

14. The method of claim 8, wherein the search scope includes at least one of an item category or an item feature.

15. The method of claim 14, wherein the item feature includes at least one of a pattern, a color, a logo, a shape, a texture, or an ornamentation.

16. The method of claim 8, further comprising:
determining an item category based on the sketch; and
presenting the determined item category to the user.

17. The method of claim 8, further comprising:
determining similarity levels between the sketch and each of the identified inventory items;
sorting the identified inventory items based on the determined similarity levels; and
causing presentation of the sorted inventory items to the user.

18. The method of claim 8, further comprising:
identifying the set of inventory items similar to the search item while the user is generating the sketch.

19. A non-transitory machine readable medium that stores instructions that, when executed by a machine, cause the machine to perform operations comprising:
receiving a sketch corresponding to a search item from a user device of a user, the sketch being at least partially generated by the user physically interacting with the user device, the search item being a physical product of interest to the user;
extracting an item attribute from the sketch, the item attribute corresponding to a first physical attribute of the search item;
identifying a set of inventory items similar to the search item based on the extracted item attribute and a search scope, the set of inventory items corresponding to an available stock of physical products;
retrieving a purchase history of the user;
determining a user preference based on the purchase history;
identifying a suggested attribute based at least in part on the extracted item attribute and the determined user preference, the suggested attribute corresponding to a second physical attribute of the search item;
providing the user with an option on a user interface of the user device to select the suggested attribute;
receiving a user selection of the suggested attribute;
applying the selected suggested attribute to the sketch;
updating the set of inventory items based on the selected suggested attribute; and
causing presentation of the updated set of inventory items on the user interface of the user device.

* * * * *